(12) United States Patent
Liu et al.

(10) Patent No.: US 7,837,337 B2
(45) Date of Patent: Nov. 23, 2010

(54) PROJECTION APPARATUS

(75) Inventors: Chin-Ku Liu, Miao-Li (TW); Sze-Ke Wang, Miao-Li (TW)

(73) Assignee: Coretronic Corporation, Hsinchu (TW)

( * ) Notice: Subject to any disclaimer, the term of this patent is extended or adjusted under 35 U.S.C. 154(b) by 590 days.

(21) Appl. No.: 11/882,764

(22) Filed: Aug. 6, 2007

(65) Prior Publication Data
US 2008/0079911 A1  Apr. 3, 2008

(30) Foreign Application Priority Data
Oct. 2, 2006 (TW) .............................. 95136610 A

(51) Int. Cl.
*G03B 21/14* (2006.01)
(52) U.S. Cl. .............................. 353/84; 353/31; 353/34; 353/38; 353/85; 353/98; 362/293; 362/305; 362/346
(58) Field of Classification Search .................. 353/84, 353/98, 31, 34, 38, 85; 362/293, 305, 346
See application file for complete search history.

(56) References Cited

U.S. PATENT DOCUMENTS

| | | | |
|---|---|---|---|
| 3,821,794 A | 6/1974 | Yoneyama | |
| 5,371,617 A | 12/1994 | Mitsutake et al. | |
| 6,621,640 B2 | 9/2003 | Kobayashi | |
| 6,702,447 B2 * | 3/2004 | Wang | 353/98 |
| 2002/0024636 A1 * | 2/2002 | Okamori et al. | 353/31 |
| 2004/0135975 A1 * | 7/2004 | Wang | 353/84 |
| 2005/0269925 A1 * | 12/2005 | Kobayashi et al. | 313/113 |
| 2006/0087625 A1 | 4/2006 | Liu | |
| 2006/0279713 A1 * | 12/2006 | Wang et al. | 353/101 |

FOREIGN PATENT DOCUMENTS

| | | |
|---|---|---|
| TW | 562988 | 11/2003 |
| TW | I233527 | 6/2005 |
| TW | I245129 | 12/2005 |
| TW | I267687 | 12/2006 |
| TW | 200702877 A | 1/2007 |

* cited by examiner

*Primary Examiner*—Georgia Y Epps
*Assistant Examiner*—Sultan Chowdhury
(74) *Attorney, Agent, or Firm*—Bacon & Thomas, PLLC

(57) ABSTRACT

A projection apparatus includes an illumination system, a projection module and at least a filter. The illumination system is for generating an illumination light beam. The projection module is for receiving the illumination light beam from the illumination system and projecting an image according to the illumination light beam. The filter is disposed in the illumination system and located on a light path defined by the illumination light beam. The filter comprises a first filtering part and a second filtering part. A minimum wavelength of a wavelength range of transmitted light of the second filtering part is larger than a minimum wavelength of a wavelength range of transmitted light of the first filtering part, or a maximum wavelength of a wavelength range of transmitted light of the second filtering part is smaller than a maximum wavelength of a wavelength range of transmitted light of the first filtering part.

18 Claims, 5 Drawing Sheets

PROJECTION APPARATUS

This application claims the benefit of Taiwan application Serial No. 95136610, filed Oct. 2, 2006, the subject matter of which is incorporated herein by reference.

BACKGROUND OF THE INVENTION

1. Field of the Invention

The invention relates in general to a projection apparatus, and more particularly to a projection apparatus, which reduces effects of image flare and stray-light leak by using different filtering parts or reflection areas to maintain image luminance.

2. Description of the Related Art

The projector provides an illumination light beam via an illumination system, transforms the illumination light beam into an image light beam via a digital micro-mirror device (DMD), and projects the image light beam from a projection lens onto a screen to form an image. An f/number of the projection lens is used to control the luminance of the image. The smaller the f/number is, the larger the radius of the stop and the amount of light passing through the stop is, and the larger the f/number is, the smaller the radius of the stop and the amount of light passing through the stop is. Therefore, when one designing a projector, the projection lens with a smaller f/number is usually used to improve the luminance of the projector.

Referring to FIG. 1, a ray-fan diagram of a projection lens using a smaller f/number (i.e. f/2) is shown. From FIG. 1, it can be known that red, green and blue light with different wavelength has different aberration on an image-formation plane. Especially, the large-angled blue light with shorter wavelength is obviously deviated from a normal image-formation position, which results in a serious flare at the outer periphery of the blue light and thus image flare make the clear focusing become difficult. In the conventional projection lens or illumination system, an opaque block plate is added to block the large-angled light from entering the projector. However, this method also blocks the large-angled red and green light in addition to the large-angled blue light, which reduces luminance of the projector.

Besides, a dark-coating material is coated in the region outside of an effective area (i.e. an area with a micro-mirror array) of the DMD to reduce stray light. The dark-coating material has different reflection rates for the light with different wavelength and usually has a higher reflection rate for the blue light with shorter wavelength. The reflected stray light generates blue light leak through the projection lens, which provides extra blue color at parts of the projection image. Especially, when the image is a dark frame, i.e. every micro-mirror of the DMD is in an off state, the effect of local blue-light leak is observed more clearly. The conventional solution is to add an opaque block plate in the illumination system to block the off-state light from entering the projection lens. However, this method similarly blocks the red and green light in addition to the blue light, which reduces the luminance of the projector.

SUMMARY OF THE INVENTION

The present invention is directed to a projection apparatus which reduces effects of image flare and stray-light leak by using different filtering parts or reflection areas to maintain its luminance.

According to a first aspect of the present invention, a projection apparatus is provided. The projection apparatus comprises an illumination system, a projection module and at least a filter. The illumination system is for generating an illumination light beam. The projection module is for receiving the illumination light beam from the illumination system and projecting an image according to the illumination light beam. The filter is disposed in the illumination system and located on a light path defined by the illumination light beam. The filter comprises a first filtering part and a second filtering part. A minimum wavelength of a wavelength range of transmitted light of the second filtering part is larger than a minimum wavelength of a wavelength range of transmitted light of the first filtering part, or a maximum wavelength of a wavelength range of transmitted light of the second filtering part is smaller than a maximum wavelength of a wavelength range of transmitted light of the first filtering part.

According to a second aspect of the present invention, a projection apparatus is provided. The projection apparatus comprises an illumination system and a projection module. The illumination system comprises a light source and the light source comprises a lamp and a reflector. The lamp is for generating an illumination light beam and the reflector is for reflecting the illumination light beam. The reflector has a first reflection area and a second reflection area. A minimum wavelength of a wavelength range of reflection light of the second reflection area is larger than a minimum wavelength of a wavelength range of reflection light of the first reflection area or a maximum wavelength of a wavelength range of reflection light of the second reflection area is smaller than a maximum wavelength of a wavelength range of reflection light of the first reflection area. The projection module is for receiving the illumination light beam from the illumination system and projecting an image according to the illumination light beam.

Other objectives, features and advantages of the present invention will be further understood from the further technology features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. The components of the present invention can be positioned in a number of different orientations. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Accordingly, the drawings and descriptions will be regarded as illustrative in nature and not as restrictive.

Embodiment One

Figure 1:
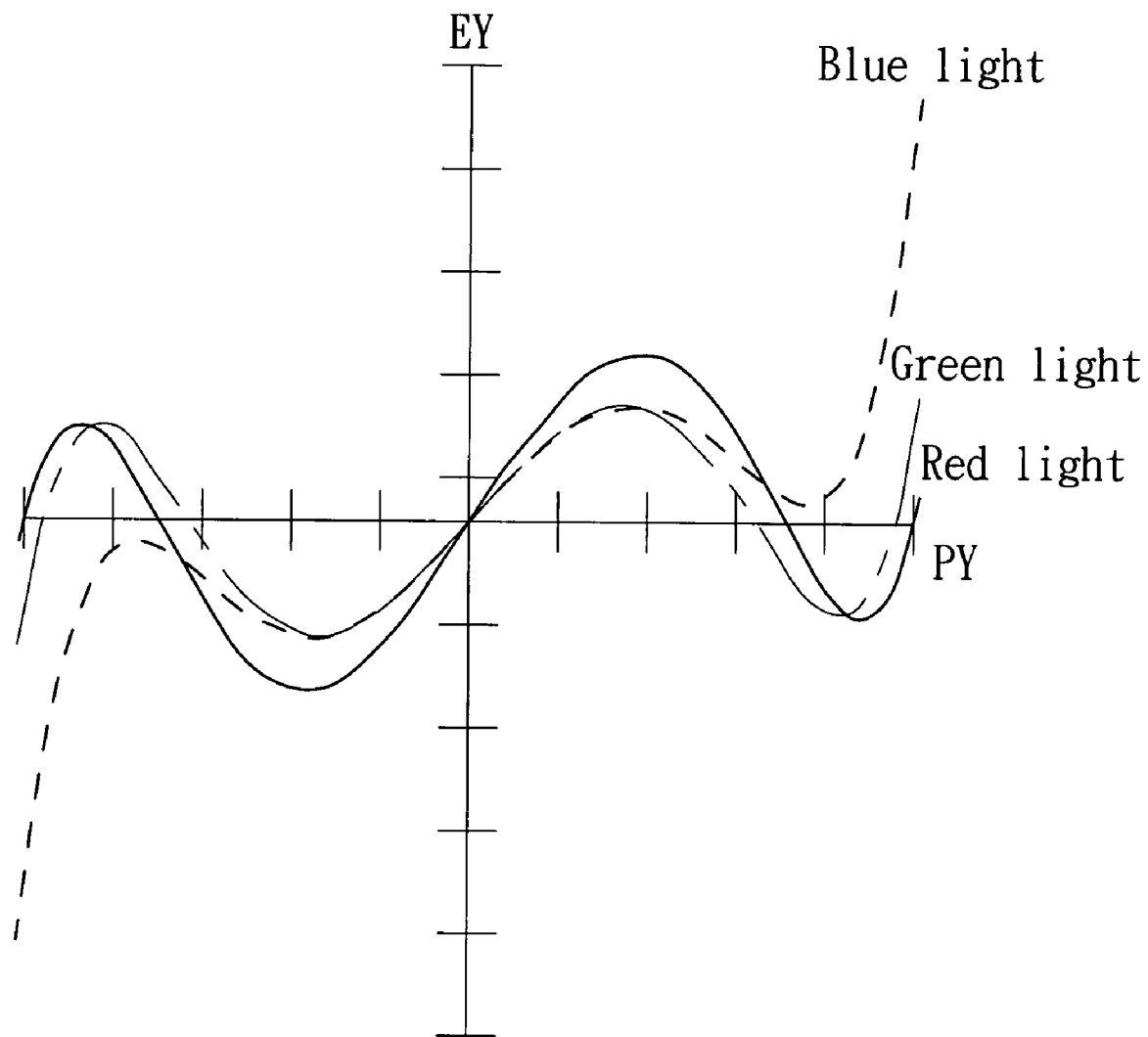
FIG. 1 is a ray-fan diagram of a conventional projection lens.
Figure 2A:
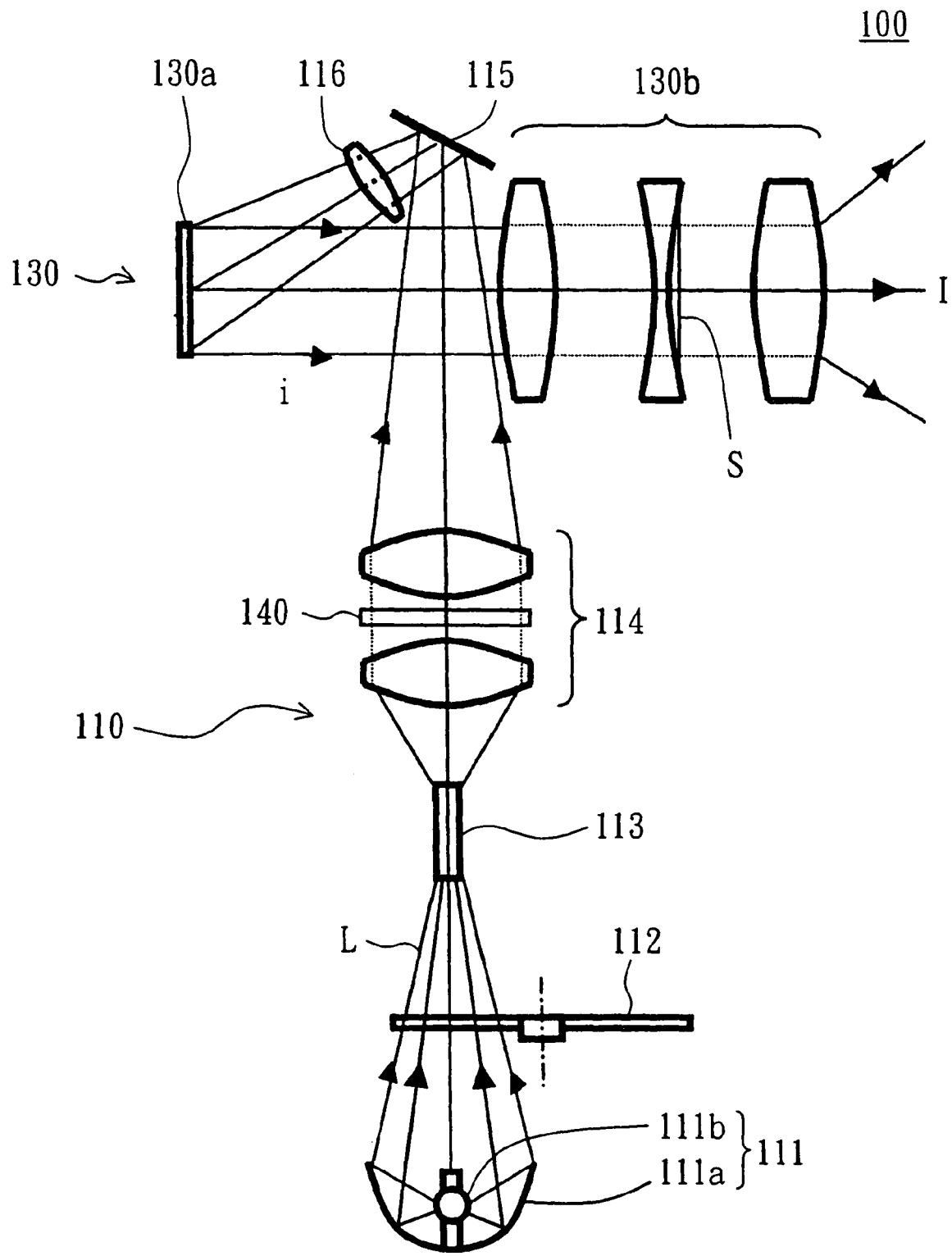
FIG. 2A is a schematic diagram of a projection apparatus according to a first embodiment of the present invention.

Referring to FIG. 2A, a schematic diagram of a projection apparatus according to a first embodiment of the present invention is shown. A projection apparatus 100 includes an illumination system 110, a projection module 130 and at least a filter 140. The illumination system 110 is for generating an illumination light beam L and the projection module 130 is for receiving the illumination light beam L from the illumination system 110 and projecting an image I according to the illumination light beam L onto a screen (not shown in the figure).

The illumination system 110 includes a light source 111, a color generation device 112, an integration rod 113, a lens set 114, a mirror 115 and a relay lens 116. For example, the light source 111 is a high-pressure mercury lamp or halogens lamp for generating the illumination light beam L. The light source 111 includes a reflector 111a and a lamp 111b disposed in the reflector 111a. The illumination light beam L radiated by the lamp 111b is reflected by the reflector 111a to focus on the color generation device 112. The color generation device is, for example, a color wheel for subsequently dividing the illumination light beam L into red, blue and green light. The red, blue and green light is uniformed by the integration rod 113 and then goes into the projection module 130 via the lens set 114, mirror 115 and relay lens 116.

The projection module 130 includes a light valve 130a and a projection lens 130b. The light valve 130a is a digital micro-mirror device (DMD), liquid crystal display (LCD) or liquid crystal on silicon (LCOS). In the embodiment, the light valve 130a is exemplified to be a DMD for illustration. The DMD of the light valve 130a, after receiving the illumination light beam L, generates an image light beam i accordingly. The projection lens 130b, after receiving the image light beam i, projects the image light beam i into the image I accordingly. The projection lens 130b includes a stop S.

The filter 140 is disposed in the illumination system 110 and located on a light path defined by the illumination light beam L. In detailed description, the filter 140 is disposed at a conjugate position of the stop S in the illumination system 110 or disposed between the light source 111 and the integration rod 113. The conjugate position is set according to the disposition relationship and light-path design of optical devices in the projection apparatus 100. Because the filter 140 is not directly disposed on the image-formation plane, the image quality is not affected.

Figure 2B:
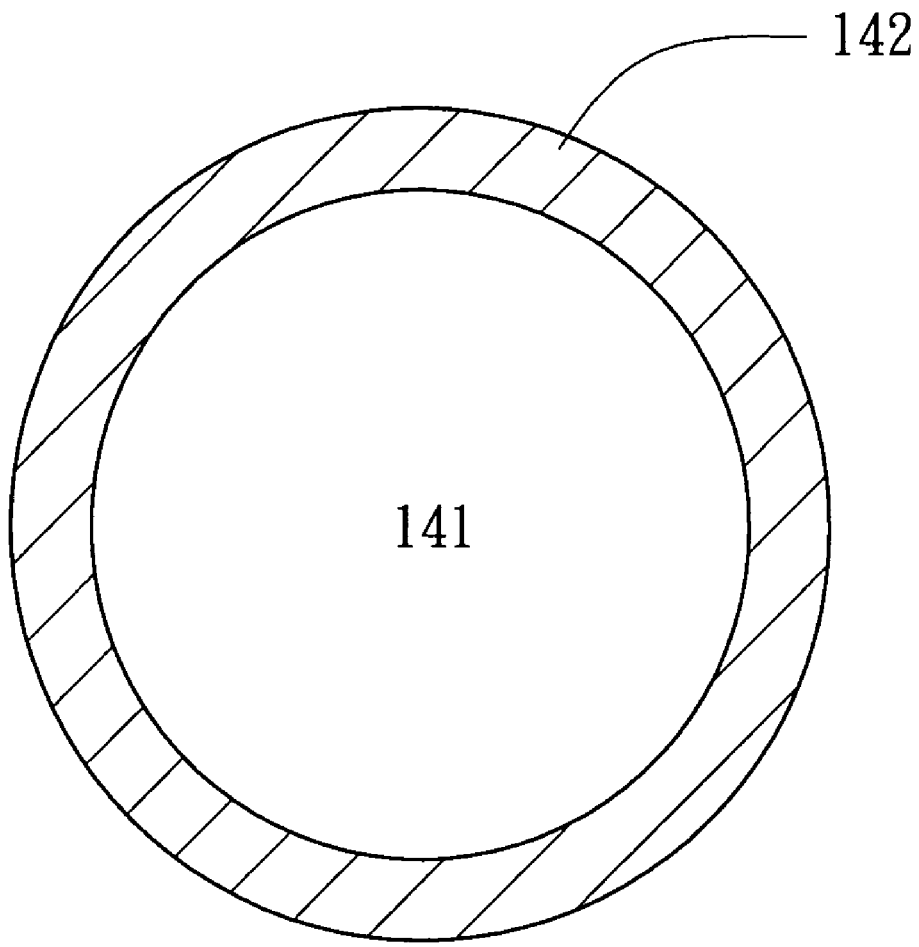
FIG. 2B is a schematic diagram of the filter in FIG. 2A.

Besides, as shown in FIG. 2B, the filter 140 has a first filtering part 141 and a second filtering part 142 (shown by the dash-line area). A minimum wavelength of a wavelength range of transmitted light of the second filtering part 142 is larger than a minimum wavelength of a wavelength range of transmitted light of the first filtering part 141. The first filtering part 141 is round, the second filtering part 142 is annular and the second filtering part 142 surrounds the first filtering part 141.

In the embodiment, the filter 140 is disposed at the conjugate position of the stop S in the illumination system 110, the wavelength range of the first filtering part 141 includes the red-light wavelength range, green-light wavelength range and blue-light wavelength range, and the wavelength range of the second filtering part 142 includes the red-light wavelength range and green-light wavelength range. For example, the wavelength range of transmitted light of the first filtering part 141 is 440 nm~720 nm, the wavelength range of transmitted light of the second filtering part 142 is 550 nm~850 nm. After the illumination light beam L passes the filter 140, visible-light components (i.e. red, green and blue light) of the illumination light beam L pass through the first filtering part 141, while the blue-light component is blocked by the second filtering part 142, and only the red and green light of the illumination light beam L pass through the second filtering part 142. Therefore, by using the second filtering part 142 to remove the blue-light component causing the image flare of the illumination light beam L, the red and green light without affecting the image flare is not blocked and the luminance of the projection apparatus is improved.

The effective radius of the filter 140 for red and green light transmission is larger than that of the filter 140 for blue light transmission, so that, without affecting the luminance of the red and green light, only the blue-light component is filtered to reduce the image flare effect. Of course, in practical application, it is the light with another wavelength range but not the blue light to generate the image flare. In such case, the same effect is attained by adjusting the difference between the wavelength ranges of transmitted light of the two filtering parts. For example, if the light with longer wavelength causes the image flare, a maximum wavelength of the wavelength range of transmitted light of the second filtering part 142 is set to be smaller than a maximum wavelength of the wavelength range of transmitted light of the first filtering part 141 to filter out the relevant color light. For example, when the red light causes the image flare, the wavelength range of transmitted light of the first filtering part 141 is set to include wavelength ranges of red, green and blue light, and the wavelength range of transmitted light of the second filtering part 142 is set to include wavelength ranges of green and blue light.

Embodiment Two

Figure 3A:
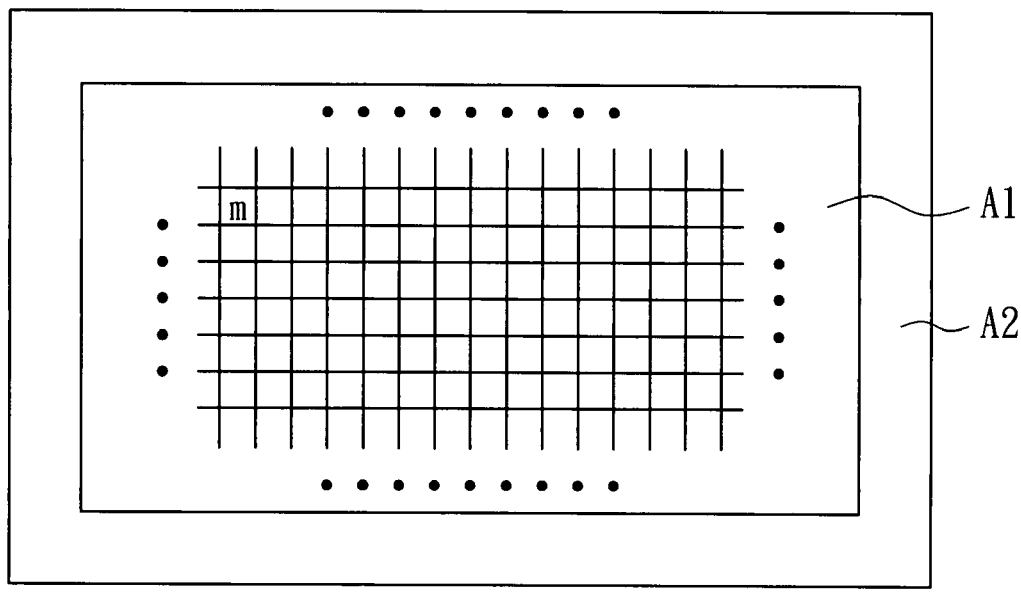
FIG. 3A is a schematic diagram of the DMD in FIG. 2A.
Figure 3B:
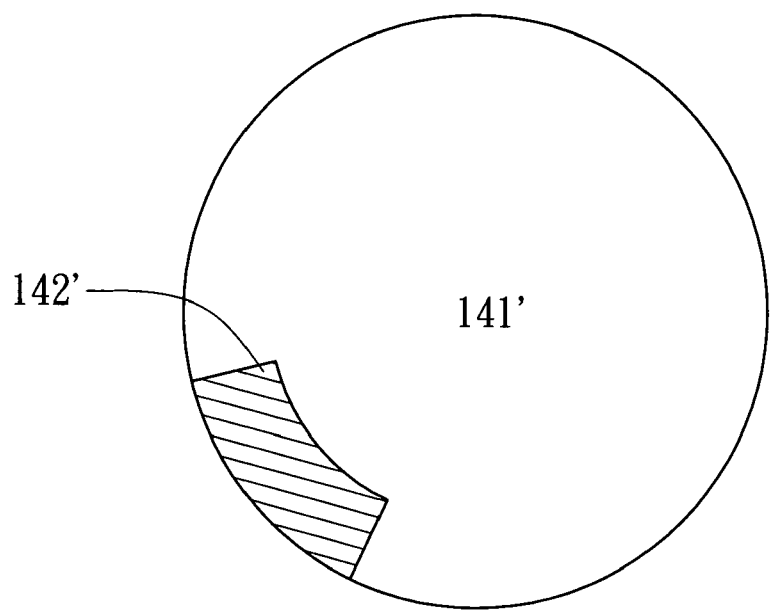
FIG. 3B is a schematic diagram of a filter according to a second embodiment of the invention.

Referring to FIG. 3A and FIG. 3B, schematic diagrams of the DMD in FIG. 2A and a filter according to a second embodiment of the invention are respectively shown. As shown in FIG. 3A, the DMD (i.e. light valve 130a) includes an effective area A1 and a dark-coating area A2 disposed at the outer periphery of the effective area A1. The effective area A1 is an area having micro-mirror m arranged in an array. The dark-coating area A2 is for reducing the stray-light effect of the image I.

Besides, the dark-coating area A2 has a higher reflection rate for the light with wavelength in a first wavelength range than the light with wavelength outside the first wavelength range. The first wavelength is a blue-light wavelength range for instance. The second filtering part 142' of the filter 140' corresponds to the dark-coating area A2 so that the illumination light beam L passing through the second filtering part 142' of the filter 140' is projected onto the dark-coating area A2. In the embodiment, if the filter 140' is located at the position of the filter 140 of FIG. 2A, the second filtering part 142' of the filter 140' is located on an edge of the filter 140' (as shown in FIG. 3B).

The wavelength ranges of transmitted light of the first filtering part 141' and second filtering part 142' are similarly designed as in the first embodiment, that is, the minimum wavelength of a wavelength range of transmitted light of the second filtering part 142 is larger than the minimum wavelength of a wavelength range of transmitted light of the first filtering part 141, or the maximum wavelength of a wavelength range of transmitted light of the second filtering part 142 is smaller than the maximum wavelength of a wavelength range of transmitted light of the first filtering part 141. Preferably, the wavelength range of the transmitted light of the second filtering part 142' excludes the first wavelength range while the wavelength range of the transmitted light of the first filtering part 141' includes the first wavelength range. For example, when the first wavelength range is a blue-light wavelength range, the wavelength range of transmitted light of the second filtering part 142' includes the wavelength ranges of red and green light, and the wavelength range of transmitted light of the first filtering part 141' includes the wavelength ranges of blue, red and green light. Therefore, the illumination light beam L filtered by the second filtering part 142' to reach the dark-coating area A2 has only the red and green light components remained, which have both a lower reflection rate. Through a light-absorption effect of the dark-coating area A2, in the end, the conventional light-leak issue is solved without affecting the luminance of the projection apparatus.

When the first wavelength range is a red-light wavelength range, the wavelength range of transmitted light of the second filtering part 142' includes the wavelength ranges of blue and green light, and the wavelength range of transmitted light of the first filtering part 141' includes the wavelength ranges of blue, red and green light. Therefore, the illumination light beam L filtered by the second filtering part 142' to reach the dark-coating area A2 has only the blue and green light components remained, both of which have a lower reflection rate. Through a light-absorption effect of the dark-coating area A2, in the end, the conventional light-leak issue is solved without affecting the luminance of the projection apparatus.

Embodiment Three

Figure 4:
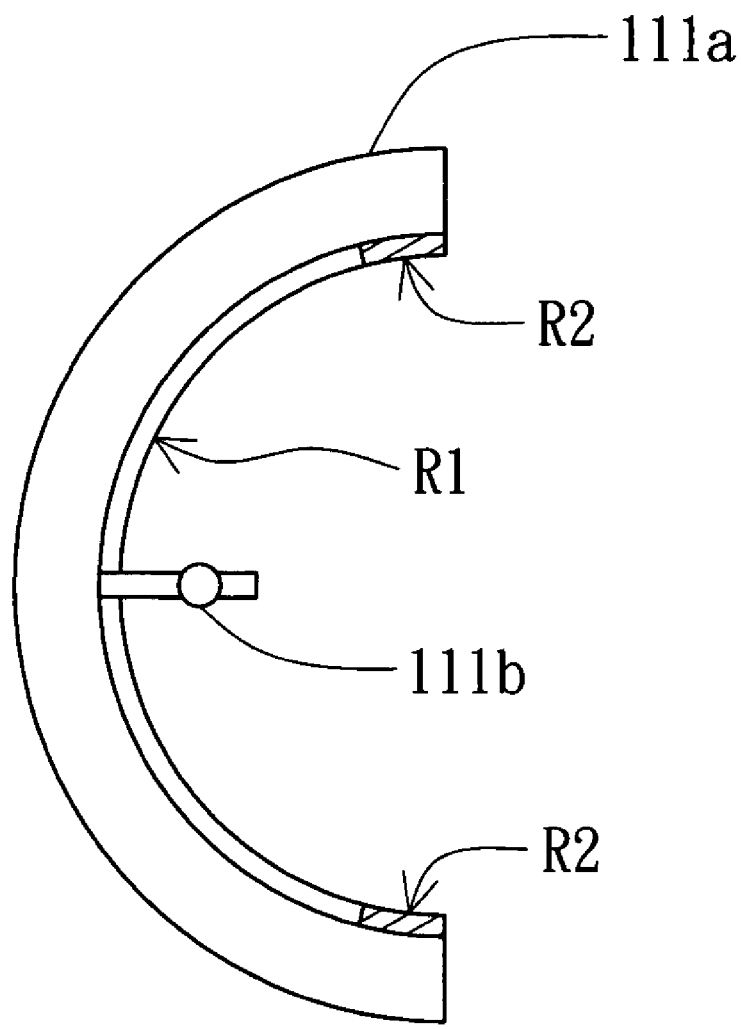
FIG. 4 is a cross-sectional diagram of the light source of FIG. 2A.

Referring to FIG. 4, a cross-sectional diagram of the light source 111 of FIG. 2A is shown. In the embodiment, the inner surface of the reflector 111a of the light source 111 has a first reflection area R1 and a second reflection area R2. The second reflection area R2 is located on an edge of the reflector 111 and surrounds the first reflection area R1. The first reflection area R1 and the second reflection area R2 are for reflecting and focusing the illumination light beam L. A minimum wavelength of a wavelength range of reflection light of the second reflection area R2 is larger than a minimum wavelength of a wavelength range of reflection light of the first reflection area R1.

In the embodiment, the wavelength range of reflection light of the first reflection area R1 includes wavelength ranges of red, green and blue light, and the wavelength range of reflection light of the second reflection area R2 includes wavelength ranges of red and green light. The first reflection area R1 reflects red, green and blue light while the second reflection area R2 reflects only red and green light. Therefore, by using the second reflection area R2, the red and green light of the illumination light beam L are reflected, but not the blue light, and thus the blue light causing the image flare of the illumination light beam L is filtered, but not the red and green light without affecting the image flare, which improves the luminance of the projection apparatus.

Of course, according to the practical design, it may be color light with another wavelength range generating the image flare but not the blue light. In this case, the same effect is achieved by adjusting the difference between the wavelength ranges of the two reflection areas. For example, if the color light with longer wavelength generates the image flare, it is designed that a maximum wavelength of a wavelength range of reflection light of the second reflection area is smaller than a maximum wavelength of a wavelength range of reflection light of the first reflection area. For example, when the red light generates the image flare, the wavelength range of reflection light of the first reflection area includes wavelength ranges of red, green and blue light, and the wavelength range of reflection light of the second reflection area include wavelength ranges of green and blue light. In this way, the red light of the illumination light beam L, which causes the image flare is filtered and only the blue and green light of the illumination light beam L is reflected.

In the above embodiment, the filtering parts 141, 142, 141' and 142' or reflection areas R1 and R2 are also applied to other optical devices in the projection apparatus 100 of FIG. 2A. For example, a surface of one lens of the lens set 114 or relay lens 116 is treated by suitable film coating to achieve the same effect as the first filtering part and second filtering part of the filter. Or the surface of the mirror 115 is designed to have the first reflection area and second reflection area as the reflector 111a of FIG. 4 to achieve the same effect. Besides, the above embodiment and relevant alternative applications are combined in usage. As long as the projection apparatus uses filtering parts or reflection areas to reduce the image flare and stray light leak and maintain the image luminance, all these are not depart from the scope of the invention.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
 an illumination system, for generating an illumination light beam, wherein the illumination system comprises a color generation device;
 a projection module, for receiving the illumination light beam from the illumination system and projecting an image according to the illumination light beam; and
 at least a filter, disposed in the illumination system and located on a light path defined by the illumination light beam, the filter being located between the color generation device and the projection module, the filter comprising a first filtering part and a second filtering part, wherein a minimum wavelength of a wavelength range of transmitted light of the second filtering part is larger than a minimum wavelength of a wavelength range of transmitted light of the first filtering part, or a maximum wavelength of a wavelength range of transmitted light of the second filtering part is smaller than a maximum wavelength of a wavelength range of transmitted light of the first filtering part.

2. The projection apparatus according to claim 1, wherein the wavelength range of the transmitted light of the first filtering part comprises wavelength ranges of red, green and blue light, and the wavelength range of the transmitted light of the second filtering part comprises wavelength ranges of red and green light.

3. The projection apparatus according to claim 1, wherein the projection module comprises a light valve and a projection lens, the light valve is for receiving the illumination light beam and accordingly generating an image light beam, the projection lens is for receiving the image light beam and accordingly generating the image, the projection lens comprises a stop, and the filter is located at a conjugate position of the stop.

4. The projection apparatus according to claim 1, wherein the projection module comprises a light valve and a projection lens, the light valve comprises a digital micro-mirror device, the digital micro-mirror device comprises an effective area and a dark-coating area disposed at the outer periphery of the effective area and the dark-coating area has a higher reflection rate for the light with wavelength in a first wavelength range than the light with wavelength outside the first wavelength range, the second filtering part of the filter corresponds to the dark-coating area and the illumination light beam passing through the second filtering part of the filter is projected onto the dark-coating area.

5. The projection apparatus according to claim 4, wherein the wavelength range of the transmitted light of the second filtering part excludes the first wavelength range while the wavelength range of the transmitted light of the first filtering part includes the first wavelength range.

6. The projection apparatus according to claim 5, wherein the first wavelength range is a blue-light wavelength range, the wavelength range of transmitted light of the first filtering part comprises wavelength ranges of red, green and blue light, and the wavelength range of transmitted light of the second filtering part comprises wavelength ranges of red and green light.

7. The projection apparatus according to claim 1, wherein the first filtering part is round, the second filtering part is annular, and the second filtering part surrounds the first filtering part.

8. The projection apparatus according to claim 1, wherein the illumination system comprises a light source, the light source comprises a reflector, the reflector has a first reflection area and a second reflection area on an inner surface of the reflector, a minimum wavelength of a wavelength range of reflection light of the second reflection area is larger than a minimum wavelength of a wavelength range of reflection light of the first reflection area.

9. The projection apparatus according to claim 8, wherein the wavelength range of reflection light of the first reflection area comprises wavelength ranges of red, green and blue light, the wavelength range of reflection light of the second reflection area comprises wavelength ranges of red and green light.

10. The projection apparatus according to claim 8, wherein the second reflection area is located on an edge of the reflector and surrounds the first reflection area.

11. A projection apparatus, comprising:
an illumination system, comprising a light source, the light source comprising:
a lamp, for generating an illumination light beam; and
a reflector, for reflecting the illumination light beam, the reflector having a first reflection area and a second reflection area, wherein a minimum wavelength of a wavelength range of reflection light of the second reflection area is larger than a minimum wavelength of a wavelength range of reflection light of the first reflection area or a maximum wavelength of a wavelength range of reflection light of the second reflection area is smaller than a maximum wavelength of a wavelength range of reflection light of the first reflection area; and
a projection module, for receiving the illumination light beam from the illumination system and projecting an image according to the illumination light beam.

12. The projection apparatus according to claim 11, wherein the wavelength range of reflection light of the first reflection area comprises wavelength ranges of red, green and blue light, the wavelength range of reflection light of the second reflection area comprises wavelength ranges of red and green light.

13. The projection apparatus according to claim 11, wherein the second reflection area is located on an edge of the reflector and surrounds the first reflection area.

14. The projection apparatus according to claim 11, further comprising at least a filter disposed on a light path defined by the illumination light beam, the filter has a first filtering part and a second filtering part, and a minimum wavelength of a wavelength range of transmitted light of the second filtering part is larger than a minimum wavelength of a wavelength range of transmitted light of the first filtering part.

15. The projection apparatus according to claim 14, wherein the projection module comprises a light valve and a projection lens, the light valve is for receiving the illumination light beam and accordingly generating an image light beam, the projection lens is for receiving the image light beam and accordingly generating the image, the projection lens comprises a stop, and the filter is located at a conjugate position of the stop.

16. The projection apparatus according to claim 14, wherein the first filtering part is round, the second filtering part is annular, and the second filtering part surrounds the first filtering part.

17. The projection apparatus according to claim 14, wherein the projection module comprises a light valve and a projection lens, the light valve comprises a digital micro-mirror device, the digital micro-mirror device comprises an effective area and a dark-coating area disposed at the outer periphery of the effective area and the dark-coating area has a higher reflection rate for the light with wavelength in a first wavelength range than the light with wavelength outside the first wavelength range, the second filtering part of the filter corresponds to the dark-coating area and the illumination light beam passing through the second filtering part of the filter is projected onto the dark-coating area.

18. The projection apparatus according to claim 17, wherein the wavelength range of the transmitted light of the second filtering part excludes the first wavelength range while the wavelength range of the transmitted light of the first filtering part includes the first wavelength range.

* * * * *